UNITED STATES PATENT OFFICE.

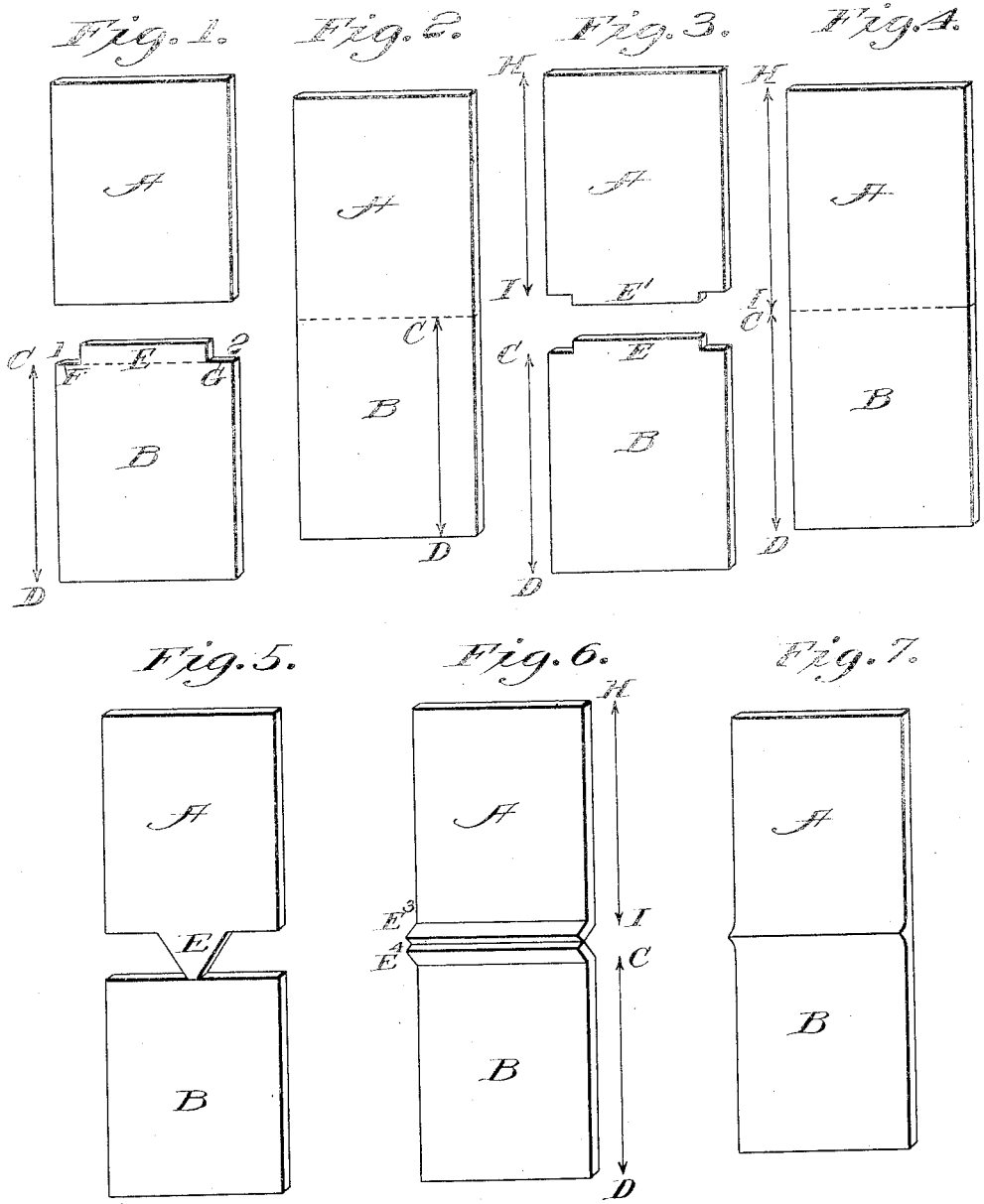

THOMAS E. MURRAY, OF NEW YORK, N. Y.

METHOD OF ELECTRICAL EDGE-WELDING.

1,206,885.   Specification of Letters Patent.   Patented Dec. 5, 1916.

Application filed March 2, 1916.   Serial No. 81,589.

*To all whom it may concern:*

Be it known that I, THOMAS E. MURRAY, a citizen of the United States, residing at New York, in the county of New York and State of New York, have invented a certain new and useful Improvement in Methods of Electrical Edge-Welding, of which the following is a specification.

The invention is a method of edge welding two members of a structure formed of metal sheets or plates. I have found that when one of two welded members of a structure is designed to have a certain length measured outwardly from the joint between the two members—or when each of said members is designed to have a certain length measured outwardly from the joint between them—the effect of the necessary pressure at the joint during the welding extrudes more or less of the fused metal which comes from one or the other member, and as a consequence in the completed structure either one or both of the members, as the case may be, is not of the designed length to fit or coöperate with other members of said structure.

My present invention completely avoids the difficulty, and renders it possible to secure accurate dimensions in the completed structure despite the necessary fusion at the welded joint.

My invention consists broadly in first forming on the edge of one of the plates or sheets to be welded—or on the edges of both sheets or plates—an extension of the sheet or plate, protruding to a predetermined amount beyond the designed length which said sheet or plate is to have measured outward from the joint. The inner limit of said extension is physically determined; that is to say, the extension is not merely a prolongation of the member to be welded beyond its designed length, but one of which the inner limit is determined by a physical change in the member itself. This physical change may be accomplished, for example, by making the extension of less cross sectional area than the surface of the edge on which it is formed, or by simply bending the extension out of line with the body of the member. In either case, the amount of metal in the thus limited extension will be predetermined, so that on welding there will be a sufficient quantity of said metal fused to cause proper union of the joint, and the remainder under the pressure at the joint will be extruded therefrom as a bur; the final result being that the extension itself practically disappears, leaving the two members united at their edges, without loss of metal by either, and hence without diminution of designed length measured outwardly from the joint.

In the accompanying drawings, Figure 1 shows two metal sheets or plates, one having on its edge an extension of less cross sectional area than the surface of the edge from which it protrudes, said extension and the edge of the opposite sheet being approximated. Fig. 2 shows said sheets welded together. Fig. 3 shows two metal sheets, each having such an extension, the extensions being approximated. Fig. 4 shows said sheets welded together. Fig. 5 shows the extension in tapering or pointed shape. Fig. 6 shows two metal sheets or plates, with extensions limited by bending the same at an angle to the body of the plates. Fig. 7 shows the sheets of Fig. 6 after welding, and also shows the bur of metal extruded at the joint.

Similar letters and numbers of reference indicate like parts.

Let it be supposed that it is desired to edge weld electrically the plates or sheets A, B in Fig. 1, and that in the completed structure it is necessary that the length C, D of sheet B should not be reduced. Obviously, if the plate B were made in the first instance of the designed length C, D and its edge was approximated to the edge of plate A, then the fused metal must come from one plate or the other, or both, and assuming it to come either wholly or in part from plate B, then plate B must of necessity under the welding pressure be shortened along the dimension C, D. To avoid this, I form on the edge of plate B an extension E, the cross sectional area of which is less than the cross sectional area of the plate on the line 1, 2, so that on each side of extension E there will be exposed edge surfaces F, G. The surfaces F, G form the inner limit of the extension E. The size of the extension is made sufficient to give the metal used in making the weld. Now under the welding pressure, the extension E melts and the two bodies come together until the surfaces F, G meet, as here shown, the edge of the opposite plate A, the metal of extension E being mostly extruded as a bur. As none of the metal of plate B within the linear dimension C, D has been melted, that dimension remains, as designed, which was to be accomplished.

Where the similar dimensions C, D and H, I in the two plates A, B are to be maintained, I form similar extensions E, E' on the two meeting edges, as shown in Fig. 3, and in such case, both of these extensions will be melted and substantially extruded, and the plates come together as before, and as shown in Fig. 4.

Instead of making the extension E in the form shown in Fig. 1, I may make it pointed, as shown at E² in Fig. 5.

Instead of physically limiting the extension by making it of smaller area than the edge of the plate on which it is formed, I may limit it by leaving its cross sectional area the same as that of the plate, and bending it over to one side, as shown at E³ and E⁴, Fig. 6. In this case, the bur of extruded metal indicated at J, Fig. 7, will appear on the side of the plate toward which the bend is made.

I do not claim herein the method of localizing the bur by bending over the plate at its welding edge, since I have described and claimed the same in U. S. Patent No. 1,189,856, granted to me July 4, 1916.

I claim:

1. The method of edge welding two members of a structure formed of metal sheets or plates, which consists in, first, forming on the edge of one of said members an extension beyond the designed length which said member is to have after welding measured outwardly from the joint and physically determining the inner limit of said extension, and, second, placing said extension in contact with the opposite member and subjecting the joint to pressure and a welding current until said extension is fused and substantially extruded from said joint and the said bodies are moved together and united to form a single body of predetermined length measured at right angles to the joint.

2. The method of edge welding two members of a structure formed of metal sheets or plates, which consists in, first, forming on the edge of each of said members a predetermined extension beyond the designed length which said member is to have after welding measured outwardly from the joint, and, second, placing said extensions in contact and subjecting the joint to pressure and a welding current until said extensions are fused and substantially extruded from the joint and said bodies are moved together and united to form a single body of predetermined length measured at right angles to the joint.

3. The method of edge welding two members of a structure formed of metal sheets or plates, which consists in forming on the edge of one of said members a predetermined extension beyond the designed length which said member is to have after welding measured outwardly from the joint, the cross sectional area of said extension being less than the cross sectional area of said body at the end from which said extension protrudes, placing said extension in contact with the opposite members, and subjecting the joint to pressure and a welding current until said extension is fused and substantially extruded from said joint and the said bodies are moved together and united to form a single body of predetermined length measured at right angles to the joint.

In testimony whereof I have affixed my signature in presence of two witnesses.

THOMAS E. MURRAY.

Witnesses:
 GERTRUDE T. PORTER,
 MAY T. McGARRY.